UNITED STATES PATENT OFFICE.

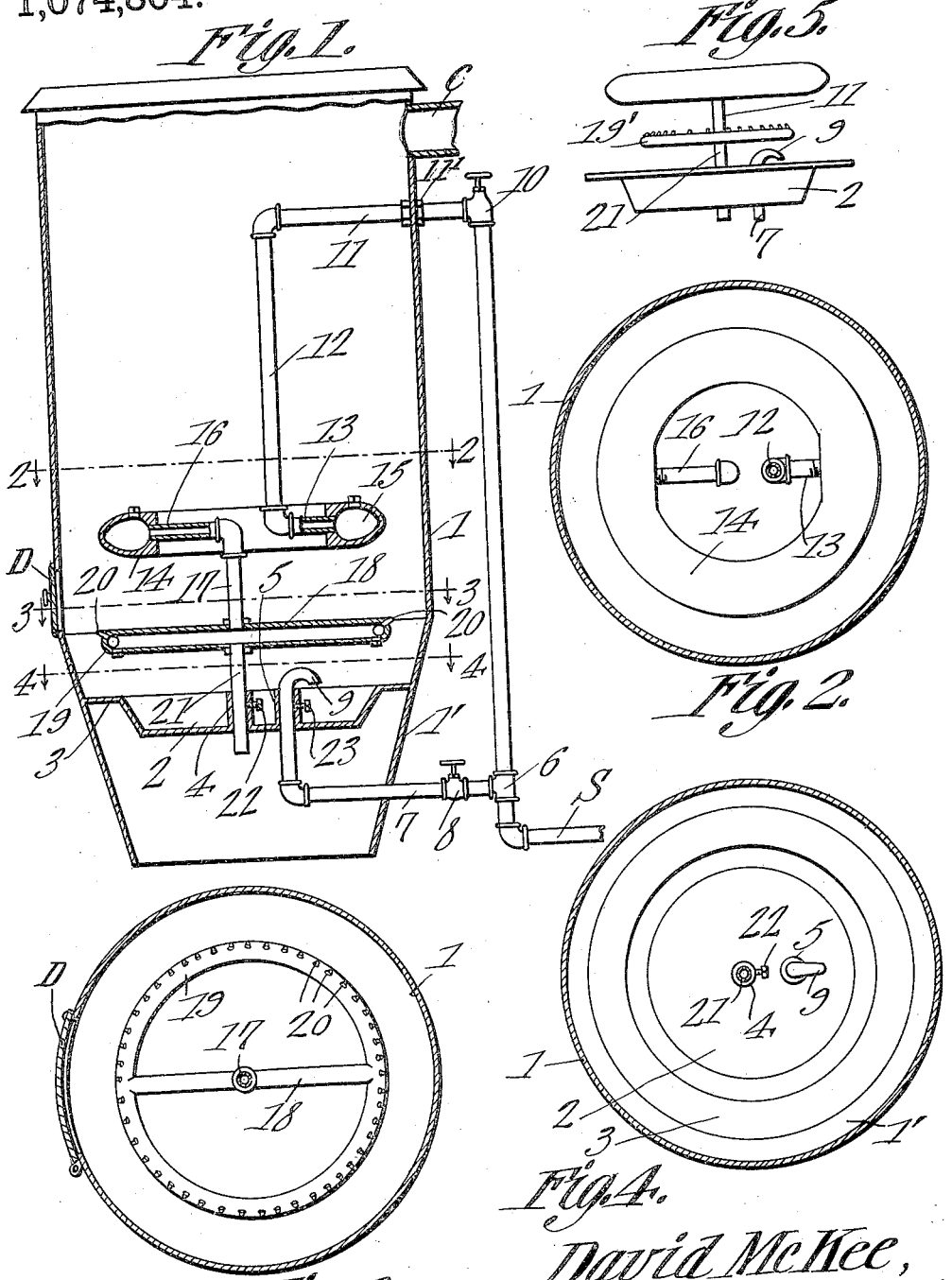

DAVID McKEE, OF WICHITA, KANSAS.

LIQUID-HYDROCARBON BURNER.

1,074,804. Specification of Letters Patent. Patented Oct. 7, 1913.

Application filed April 15, 1913. Serial No. 761,275.

*To all whom it may concern:*

Be it known that I, DAVID MCKEE, a citizen of the United States, residing at Wichita, in the county of Sedgwick and State of Kansas, have invented a new and useful Liquid-Hydrocarbon Burner, of which the following is a specification.

The present invention relates to improvements in liquid-hydrocarbon burners, one object of the present invention being the provision of a burner of this character, in which the starting pan is provided with an individual or auxiliary supplying means independent of the supply to the generator chamber, thus providing a means whereby the fluid originally supplied to start the burner in operation, does not necessarily pass through the generator and burner and thus cause an undue gumming of the parts and consequent smoking of the burning fluid and also the parts coming in contact therewith.

A further object of the present invention is the provision of a burner of this character, which is adapted to be used either as heating appliance, or a cooking appliance, the vaporizing or generating chamber being of peculiar construction, and where employed for heating being so arranged that the flame jets extend exteriorly or circumferentially thereof, while when the device is used in connection with a range or cooking stove, the burner is of less diameter than the generator and the flame jets are projected within the generator.

A still further object of the invention is the provision of a burner of this character which is simple in construction, the parts being preferably cast and constituted of pipe couplings and connections which render the assemblage and repair of the same easy.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a vertical central sectional view through the casing and portions of the burner, the pipes for supplying the starting pan and the generator being shown in elevation. Fig. 2 is a section taken on line 2—2 of Fig. 1. Fig. 3 is a section taken on line 3—3 of Fig. 1. Fig. 4 is a section taken on line 4—4 of Fig. 1. Fig. 5 is a detail view on a smaller scale and illustrating the burner used simply for cooking purposes.

Referring to the drawings, the numeral 1 designates a casing, the greater portion of which is preferably cylindrical and the lower end 1' of which being tapered, as clearly shown in Fig. 1, for the reception relatively therewithin of the starting pan 2 which is provided with the outstanding flange or rim 3, the periphery of which engages the reduced end 1' of the casing and excludes any draft from therebelow, the casing 1 being provided with the usual stove door D and the chimney C, so that air may be admitted above the pan 2 and thus supply draft to the burner.

The drip pan, as clearly shown in Fig. 1, is provided with the concentrically disposed sleeve or tube 4, and with the tube or supporting sleeve 5, which as will presently appear, supports the nozzle 9 of the supplying conduit 7 for the starting pan 2. The supply pipe S is connected to the supply of hydrocarbon fluid at any desired distance, preferably supplied by gravity at a distance of approximately five feet from the casing 1, the pipe 7 being connected to the same through the T-coupling 6, having disposed therein a manually controlled valve 8, so that the supply of the fluid to the nozzle 9 may be controlled without in any way disturbing the manually controlled valve 10 which controls the supply of the fluid to the generating chamber 14. The supply pipe S is extended upwardly and as before stated has connected therein, the manually controlled valve 10, the pipe 11 being extended laterally through the supporting coupling 11' in the wall of the casing 1, having the downwardly extending vertical pipe 12 which is connected to the conduit 13, in communication with the generator or vaporizing chamber 14, which, in the present instance, is shown in the form of a hollow ring, the chamber 15 of which is preferably oval or egg-shaped in cross section, the greater length of which is extended horizontally so that the greatest surface is exposed for generating purposes. Leading from the chamber 15 from a diametrically opposite point to the entry of the pipe 13 therein, is a pipe 16, which is connected to the vertically disposed and concentric pipe 17 which is in communication at its lower end with the diametrically disposed gas or vapor conducting pipe 18, which is in communication and assists in supporting the burner ring 19.

The burner ring 19 when employed in connection with the heating device as shown in Fig. 1, is provided with the outwardly projecting flame jet apertures 20, the burner ring being approximately of the same diameter as the generating chamber 14, said burner ring 19', as shown in Fig. 5, when used in connection with a cooking range being of less diameter than the generating chamber and provided with flame jets disposed to project the flame within the space of the generating chamber. The general construction and arrangement of the parts are identical in both forms however, the concentrically disposed support 21 being projected through the sleeve 4 of the starting pan 2 and secured therein by means of the set screw 22, the set screw 23 being connected through the sleeve 5 to the nozzle pipe 9 of the starting pan so that the parts may be properly positioned relative to each other and as clearly shown in Fig. 1.

In operation it is simply necessary to open the valve 8 and permit the starting fluid to flow within the receptacle portion of the starting pan 2, at which time the fluid is ignited by any means by igniting waste or other inflammable material, the flame from the ignited fluid, heating the generating chamber 14 so that after the valve 8 has been properly closed, the valve 10 may be opened and the fluid from the supply pipe S will be conducted through the pipe 12 into the chamber 15 of the generator or vaporizer 14, this being of sufficient heat to cause the vaporization of the fluid, the expansion of which and consequent pressure leading the same through the pipes 16 and 17 and pipe 18, to the burner ring 19.

What is claimed is:

1. A device for burning hydrocarbon liquid, including an upper ring shaped generator having a liquid inlet pipe, a gas outlet leading from the ring and extending inwardly, a vertical pipe connected thereto and depending therefrom, a pipe at right angles to and in communication with the vertical pipe, a burner connected to and in communication with the last pipe, and a starting pan supported from the last pipe below the burner.

2. A device for burning hydrocarbon liquid, including an upper ring shaped generator having a liquid inlet pipe, a gas outlet pipe leading from the ring and extending inwardly, a vertical pipe connected thereto and depending therefrom, a pipe at right angles to and in communication with the vertical pipe, a burner connected to and in communication with the last pipe, a tubular member depending from the last pipe, and a starting pan connected to the tubular member.

In testimony that I claim the foregoing as my own, I have hereto affixed my signature in the presence of two witnesses.

DAVID McKEE.

Witnesses:
BENJAMIN FRANKLIN KIEHBIEL,
J. V. WOOD.

---

Copies of this patent may be obtained for five cents each, by addressing the "Commissioner of Patents, Washington, D. C."